United States Patent
Benco et al.

(10) Patent No.: US 9,160,795 B2
(45) Date of Patent: Oct. 13, 2015

(54) METHOD TO SYNCHRONIZE CONTENT ACROSS NETWORKS

(75) Inventors: David S. Benco, New Providence, NJ (US); Pirawan Wong, Flushing, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 685 days.

(21) Appl. No.: 13/134,601

(22) Filed: Jun. 10, 2011

(65) Prior Publication Data

US 2012/0317309 A1    Dec. 13, 2012

(51) Int. Cl.
*G06F 15/16* (2006.01)
*H04L 29/08* (2006.01)

(52) U.S. Cl.
CPC .................... *H04L 67/1095* (2013.01)

(58) Field of Classification Search
CPC ............. H01L 67/1095; G06F 17/30581
USPC .................... 709/206, 207, 246, 248
See application file for complete search history.

(56) References Cited

U.S. PATENT DOCUMENTS

| | | | | |
|---|---|---|---|---|
| 8,255,812 | B1 * | 8/2012 | Parparita et al. | 715/762 |
| 8,315,978 | B2 * | 11/2012 | Suthar et al. | 707/612 |
| 2002/0078094 | A1 * | 6/2002 | Krishnaprasad et al. | 707/513 |
| 2006/0284744 | A1 * | 12/2006 | Shotland | 341/50 |
| 2007/0266034 | A1 * | 11/2007 | Pousti et al. | 707/10 |
| 2008/0103906 | A1 * | 5/2008 | Singh | 705/14 |
| 2008/0163318 | A1 * | 7/2008 | Chen et al. | 725/109 |
| 2008/0183810 | A1 * | 7/2008 | Ruedlinger | 709/203 |
| 2008/0212616 | A1 * | 9/2008 | Augustine et al. | 370/503 |
| 2008/0228945 | A1 * | 9/2008 | Yoon et al. | 709/248 |
| 2008/0267221 | A1 * | 10/2008 | Ozzie et al. | 370/503 |
| 2009/0030917 | A1 | 1/2009 | Guo et al. | |
| 2009/0089883 | A1 * | 4/2009 | Martocci | 726/28 |
| 2009/0150797 | A1 * | 6/2009 | Burkholder et al. | 715/747 |
| 2009/0282100 | A1 * | 11/2009 | Kim et al. | 709/203 |
| 2010/0010994 | A1 * | 1/2010 | Wittig et al. | 707/6 |
| 2010/0030578 | A1 * | 2/2010 | Siddique et al. | 705/3 |
| 2010/0198919 | A1 * | 8/2010 | Supakkul et al. | 709/206 |
| 2010/0306664 | A1 * | 12/2010 | Dolin et al. | 715/738 |
| 2011/0055933 | A1 * | 3/2011 | Ishiguro | 726/27 |
| 2011/0208958 | A1 * | 8/2011 | Stuedi et al. | 713/150 |
| 2012/0151383 | A1 * | 6/2012 | Kazan et al. | 715/753 |
| 2012/0158753 | A1 * | 6/2012 | He et al. | 707/752 |

FOREIGN PATENT DOCUMENTS

EP    2302509    3/2011

OTHER PUBLICATIONS

Brandon Corbin; WordPress Top Plugins, Packt Publishing; Sep. 1, 2010; Pages Front p. -237; XP002683078; Retrieved from the Internet: URL:http//pers-www.wlv.ac.uk/'in5731/mymodules/eBooks/wordpress/WordPress%20Top%20Plugins.pdf; retrived on Sep. 7, 2012.

\* cited by examiner

*Primary Examiner* — Madhu Woolcock
(74) *Attorney, Agent, or Firm* — Patti & Malvone Law Group, LLC (57) ABSTRACT

A method in one example, the method comprising receiving content at a computing server that resides at a first site, where the content is to be synchronized with at least one other site. The method further comprises storing the content to be synchronized in a homing tag, and communicating the homing tag to the at least one other site.

13 Claims, 7 Drawing Sheets

METHOD TO SYNCHRONIZE CONTENT ACROSS NETWORKS

TECHNICAL FIELD

This invention relates generally to synchronizing content across networks, and more particularly to synchronizing content across networks where the content may be updated by a number of users.

BACKGROUND

As computer devices become more common, more people store information or content on-line that may be updated or commented upon by any number of users. The information, however, is typically stored at a single site and is not shared or synchronized across sites. At the same time, users may have access to many different sites that typically do not share information. For example, a user may have a computer account at work, and an account with a social networking site such as Facebook, Myspace or some other social networking site. This user may post content at each of the different sites. In some cases, a user may want to synchronize posted content across the different sites, and allow others to comment or add to the content. This is difficult in an environment where a user may have different accounts across the different sites, and where others on one site may not be able to update content on another site.

Typically a problem with sharing information across sites comes up when a user wants to create a blog on one site, but wants the blog synchronized with other sites so that the blog contains the same information on each site even though different users may be commenting from different sites. For example, a user may want to start a blog at a work site, but the user may want others at a social site, such as Facebook, to be able to enter comments on the blog and have the updated blog synchronized with other sites so that the plurality of sites contain the same comments entered at Facebook. Currently, synchronizing a blog may require the user to manually update comments from the plurality of sites. Manually updating a blog may be an error prone and time-consuming exercise.

SUMMARY

The invention in one implementation encompasses a method. The method comprises receiving content at a computing server that resides at a first site, where the content is to be synchronized with at least one other site. The method further comprises storing the content to be synchronized in a homing tag at the first site, and communicating the homing tag to the at least one other site.

Another implementation encompasses a computing server residing at a first site, where the computing server is configured to receive content comprising a homing tag, where the content is received from a second site, and where the computing server updates a homing tag comprising the computing server with the received content to synchronize content between the first site and the second site.

A further implementation encompasses a method that receives content associated with a blog post and determines whether a homing tag is associated with the blog post based on a blog thread name associated with the blog post and the homing tag. The method further comprises updating the homing tag with the content, if a homing tag is associated with the blog post, determining whether the blog post should be synchronized with at least one other site, and communicating the content to the at least one other site if the homing tag indicates the blog post should be synchronized with the at least one other site.

DESCRIPTION OF THE DRAWINGS

Features of example implementations of the invention will become apparent from the description, the claims, and the accompanying drawings in which:

DETAILED DESCRIPTION

As previously described, blogs may be started at many different sites, but a user may want to allow people from the different sites to comment on the blog and at the same time, the user may want the blog to be synchronized at other sites so that the blog has the same content at each site. It is difficult to do this manually, and content may be lost in the process of trying to keep a blog manually up-to-date manually across multiple sites. More generically, people may want to store different forms of information at remote sites and have others comment/update that information from a plurality of other sites, such that the content is synchronized across the plurality of sites. To do this, there has to be a way to synchronize that information across the multiple sites.

Figure 1:
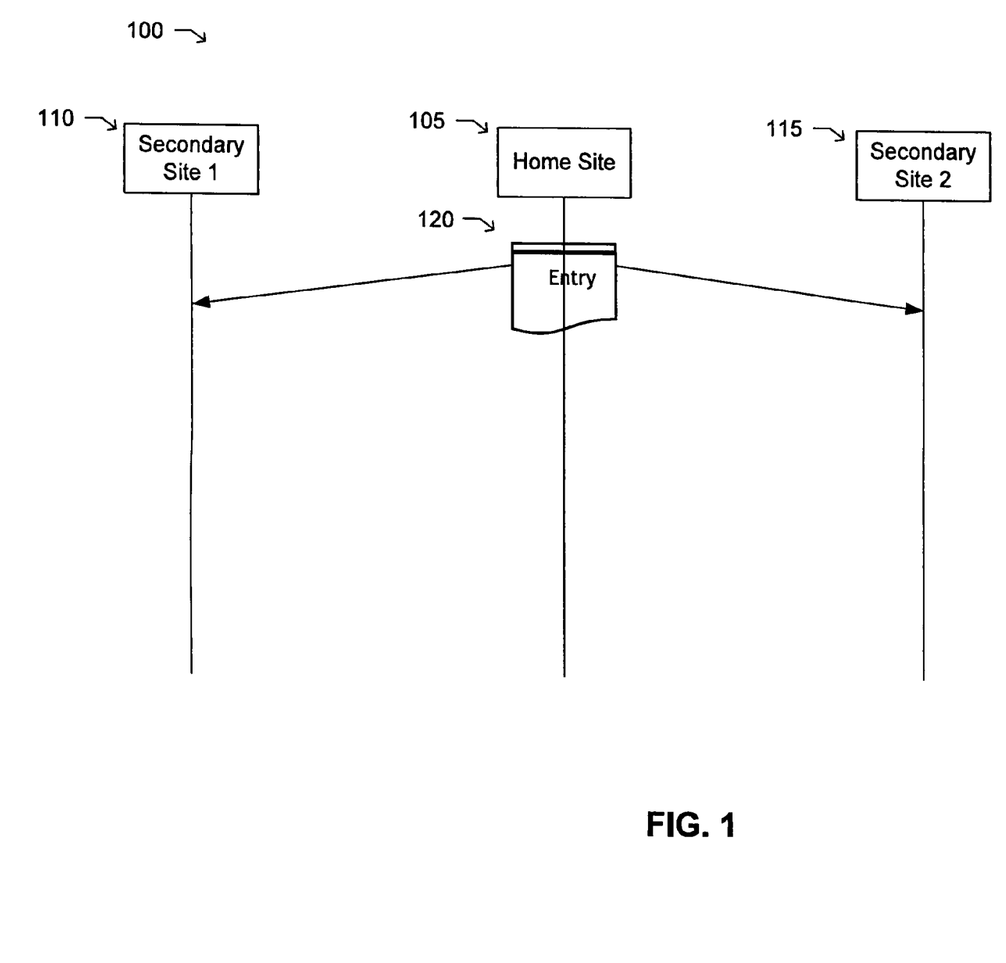
FIG. 1 is a representation of one example of a message flow diagram that may illustrate communicating content among multiple sites.

Turning now to FIG. 1, an example message flow diagram 100 that may illustrate synchronizing content among multiple sites. In an embodiment, the multiple sites may comprise blogs, websites, document tools, or other repositories of content or information which multiple users may want to update. The sites may comprise multiple content or computing servers that reside in different networks that are administered by different network owners. For example, one server may reside in the Facebook™ network, another server may reside in a blog site, such as Weebly™, or a business site, such as Alcatel-Lucent™, and other servers may reside in other different sites. In another embodiment, the computing servers reside within the same corporate or social site network, and are synchronized within that network. For example, all the computing servers 105, 110, 115 may reside within the Alcatel-Lucent network and content may by synchronized across the servers 105, 110, 115 within the corporate site. Herein, a site may be a domain, a social networking site, a site administered by a corporation, a website, or any other type of site that may be used to host content. A site may have a particular purpose and may addressed by a particular domain name. For example, a site may be a social networking site and may be addressed by the domain name Facebook.com. Another site may be business site and may be addressed by the domain name Alcatel-Lucent.com. Sites comprise one or more computing or content servers that may receive content or information that is addressed to a site domain name.

In an embodiment, the sites/servers 105, 110, 115 may host blogs, and a plurality of users may want to update or comment on the blogs at the different sites. For example, in the embodiment depicted in FIG. 1, home site 105 may comprise a server hosting a blog on a corporate website. Secondary sites 110, 115 may be social sites capable of hosting a blog, such as, Facebook, Myspace™ or any other site capable hosting a blog. A user may be an employee of the corporation hosting home site 105, and the user may also have an account on secondary sites 110 and 115. If the user creates a blog on home site 105, the user may want the blog to appear on secondary sites 110 and secondary site 115. For purposes of discussion, the corporate site is referred to as the home site because the user is initially creating the blog at this site. In other examples, however, the user may initially create the blog entry on either secondary site 110 or secondary site 115, and the blog may be synchronized with what is now being called the home site 105. Although the embodiment depicted in FIG. 1 shows a home site and two secondary sites, in other embodiments there may be a home site and one or more secondary sites.

In the embodiment discussed, the content that is synchronized is a blog. Accordingly, each site may run content management software—such as, Wordpress™, Drupal™, Wuzly, or any other content management software—in support of creating and maintaining a blog. Also, although in the embodiment depicted a blog is being synchronized, in other embodiments content in other forms may be synchronized across multiple sites. This content management software may be involved in receiving content from a user via a user interface or other supporting software, and the content management software may be used to help format and present the content to the user and/or communicate and/or receive the content to/from other sites.

A blog entry creator, henceforth "creator", may start a new blog entry using the content management software. The new blog entry is denoted by an entry 120 in FIG. 1. The creator may want to synchronize the blog with secondary site 110 and secondary site 115. When the sites are synchronized, each site 105, 110, 115 is kept up-to-date with information entered on the blog regardless which site 105, 110, 115 the information is entered on. As previously explained, secondary sites 110, 115 may be a social site, such as Facebook, and the home site 105 may be a private business website. Because different corporate entities may host these sites, and the site owner (i.e., the corporation) may not want content synchronized with certain other sites, each site that allows blog synchronization may have to be configured with a list of allowable synchronized sites. For example, the corporation hosting home site 105 may not want content synchronized with a blog that is associated with a competitor's website. This may also be true of the hosts of a secondary website. Thus, the home site 105 and the secondary sites 110, 115 may be configured with a list of allowable synchronized sites where a blogger may synchronize content. For example, in the depicted embodiment, when the creator makes a new blog entry or blog thread, the creator may be prompted for other blogs with which the creator wants to synchronize the new thread. The creator may request that the new thread is synchronized with secondary sites 110, 115 and other secondary sites. If a secondary site is not on the list of allowable synchronized sites, the entry 120 may not be synchronized with the site that is not on the list of allowable synchronized sites. The creator, however, may synchronize blog content with requested sites that are on the allowable synchronized sites list. In other embodiments, the home site 105 may automatically synchronize with all the entries comprising the list of allowable synchronized sites. In the example depicted, those allowable sites may be secondary site 110 and secondary site 115. The communication of content from the home site 105 to the secondary sites 110, 115 is illustrated with two arrows emanating from the entry 120 on the home site 105 to the secondary sites 110, 115.

If content is to be synchronized between the home site 105 and the secondary sites 110, 115, there must be a way to track and synchronize content that is posted to the home site 105 and the secondary sites 110 and 115. In an embodiment, a homing tag is created when the creator starts a new blog thread. The homing tag may comprise content that is added to a thread and may be used to communicate that content to other secondary sites. In one example, the homing tag may be created using extensible markup language (XML). Although XML is used in the example depicted, other markup languages, such as SGML, HTML, etc. may be used to represent and create the homing tag.

Table 1 includes one example of a homing tag created using XML:

TABLE 1

```
<?xml version="1.0">
<blog_entry_list count="1">
    <blog_entry>
        <source> Alcatel-LucentBlog.com </source>
        <date> Wed, 6 December, 2011, 11:00am </date>
        <media> text </media>
        <post> What are your thoughts on the new LTE standard?
        </post>
        <tools> Wordpress </tools>
        <synchronized_sites> Alcatel-LucentBlog.com, Facebook.com,
Myspace.com </synchronized_sites>
        <blog_name> Patty's Alcatel-Lucent Blog </blog_name>
        <poster_name> Patty@Alcatel-Lucent.com </poster_name>
        <thread_name>LTE Standards Comments</thread_name>
        <post_allowed> YES </post_allowed>
    </blog_entry>
</blog_entry_list>
```

The homing tag listed in table 1 is just one example of a homing tag. Other homing tags may be created with fewer or greater number of entries that comprise different tags or other fields. Those familiar with XML will readily recognize that tags are one of the fundamental building blocks of XML. Angled brackets surround a tag. For example, "<source>" is the beginning tag for a source element. The beginning source tag, "<source>", and the ending source tag "</source>", may define an element. Elements may be used to define the structure of data that comprises an XML entry. XML documents may also include attributes. In the example homing tag depicted in Table 1, there is a count attribute associated with the blog_entry_list element. The count attribute may be used to denote the number blog_entry elements that are in the homing tag. Further, the homing tag includes a line '<?xml version="1.0">' that alerts the content management software as to the version of XML that is running. Other aspects of the homing tag depicted in Table 1 will be discussed below.

Figure 2:
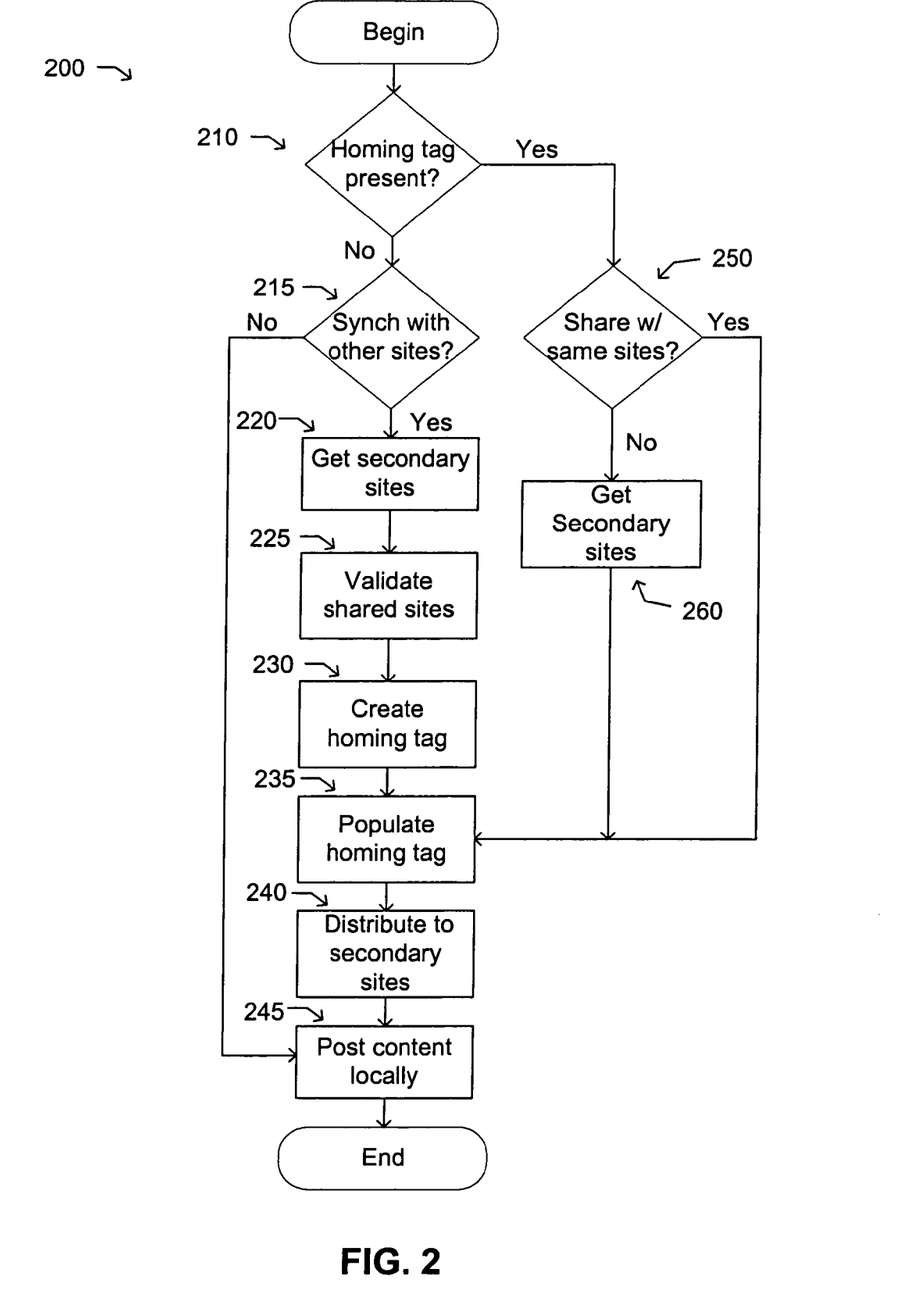
FIG. 2 is a representation of an example logic flow diagram associated with creating a blog entry that may be synchronized among multiple sites.

Turning now to FIG. 2, which depicts an example logic flow diagram 200 that shows creation of a blog thread and/or updating a currently existing blog thread on the home site 105, where the blog thread may be synchronized among multiple sites. At various times a creator may want to start a new blog thread, or the creator and/or a commentator may want to further comment on an existing blog thread. Before updating or creating a thread, it is determined if a homing tag for the blog thread already exists 210. When starting a thread the creator may be prompted for a thread name. If this is a new thread, a homing tag may not be associated with the thread, and thus the check at 210 is "No". At 215, the creator is prompted to determine whether the blog thread should be synchronized with other sites. If the creator wants to synchronize with secondary sites, the creator provides the sites with which the creator wants to synchronize the blog thread 220. The secondary sites the creator provided are validated 225 by determining whether these sites are on the allowable synchronized sites list. Sites the creator entered at 220 and that are on the allowable synchronized sites list are added to a homing tag that is created 230.

As shown in Table 1, the homing tag may comprise a blog_entry_list tag which may include entries that are made to this blog thread. Each blog entry may be denoted by a blog_entry tag and may be further comprised of tags that describe the blog entry. For example, the new homing tag may comprise a source tag that describes the source site of this blog thread. In this case, the source site is 'www.Alcatel-LucentBlog.com'. The date may comprise the date the blog thread was created. The media tag may include the media used in this blog entry. Media may describe the media that is associated with a blog post, for example, text, images, video, etc. The post tag may be the content that is posted to the blog (i.e., posted content). For example, the content may be a text blog post. In the homing tag depicted in Table 1, the post is the question, "What are your thoughts on the new LTE standard?". The tools tag may indicate the name of the content management software used to create the blog. As described above, this may be content management software such as Wordpress, Drupal, Wuzly, or any other content manager software that may be used to create and format content to be posted to a web server. The synchronized_sites tag may indicate the sites with which this blog thread is synchronized. The blog_name may indicate the name of the blog, and the poster_name tag (poster_name) may indicate the user name of the poster that created the blog. The thread_name tag may include the name of the blog thread, and the post_allowed tag may indicate whether this particular post should be displayed at the site where this homing tag resides.

When the homing tag is created 230, all fields of the homing tag may be filled in or populated 235. After the homing tag is populated, the homing tag may be examined to determine the sites with which this blog thread is synchronized. In this case, the blog thread may be created on the home site of Alcatel-LucentBlog.com and synchronized with Facebook.com and Myspace.com. Thus, the sites associated with this blog thread are Alcatel-LucentBlog.com, Facebook.com and Myspace.com as seen in the synchronized_sites tag. Accordingly, when the content of the "LTE Standards Comments" blog thread is synchronized with other sites, the blog_entry may be communicated to Facebook.com and Myspace.com. In some embodiments, the entire blog_entry is communicated to the synchronized sites, in other embodiments, only needed portions of the blog_entry are communicated to the synchronized sites. In still other embodiments, the entire homing tag is communicated to synchronized sites. The blog_entry may be communicated using the content management software or any other means that may be used to communicate information between two sites. The content is posted to the local blog site 245, which in this example would be the Alcatel-LucentBlog.com site. Herein, posting to a site may include displaying the content to a user, or adding the content to a blog thread, or adding the content to a homing tag.

If the homing tag is present 210, someone may be adding a comment to a currently existing blog thread. The user adding the comment (the blog commentator) on the Alcatel-Lucent blog site may be asked whether the blog entry should be synchronized with synchronized_sites currently in the homing tag 250. This may entail informing the user of the sites with which the blog thread is synchronized, and asking the blog commentator whether the new entry should be synchronized with the same sites. The blog commentator may enter the sites with which to synchronize the new entry 260. Upon determining sites with which the commentator wants the comment synchronized, the homing tag may be populated 235, the content may be distributed 240 to the secondary sites, and the content may be posted locally 245. In an alternate embodiment, all content on the site is synchronized with a list of predefined sites and the user is not prompted for sites with which to synchronize a comment 250. Thus, if a homing tag is present 210, the homing tag is populated with the new post 235, the content is distributed 240 and the post is posted locally.

As previously discussed, in some embodiments, a new blog thread may be automatically synchronized with a pre-defined set of sites. In such an embodiment, the user may not be prompted for sites with which to synchronize. Instead, in this alternative embodiment, if the homing tag is not present a homing tag is created, the homing tag is populated and distributed to secondary sites, and the content is posted locally.

Figure 3:
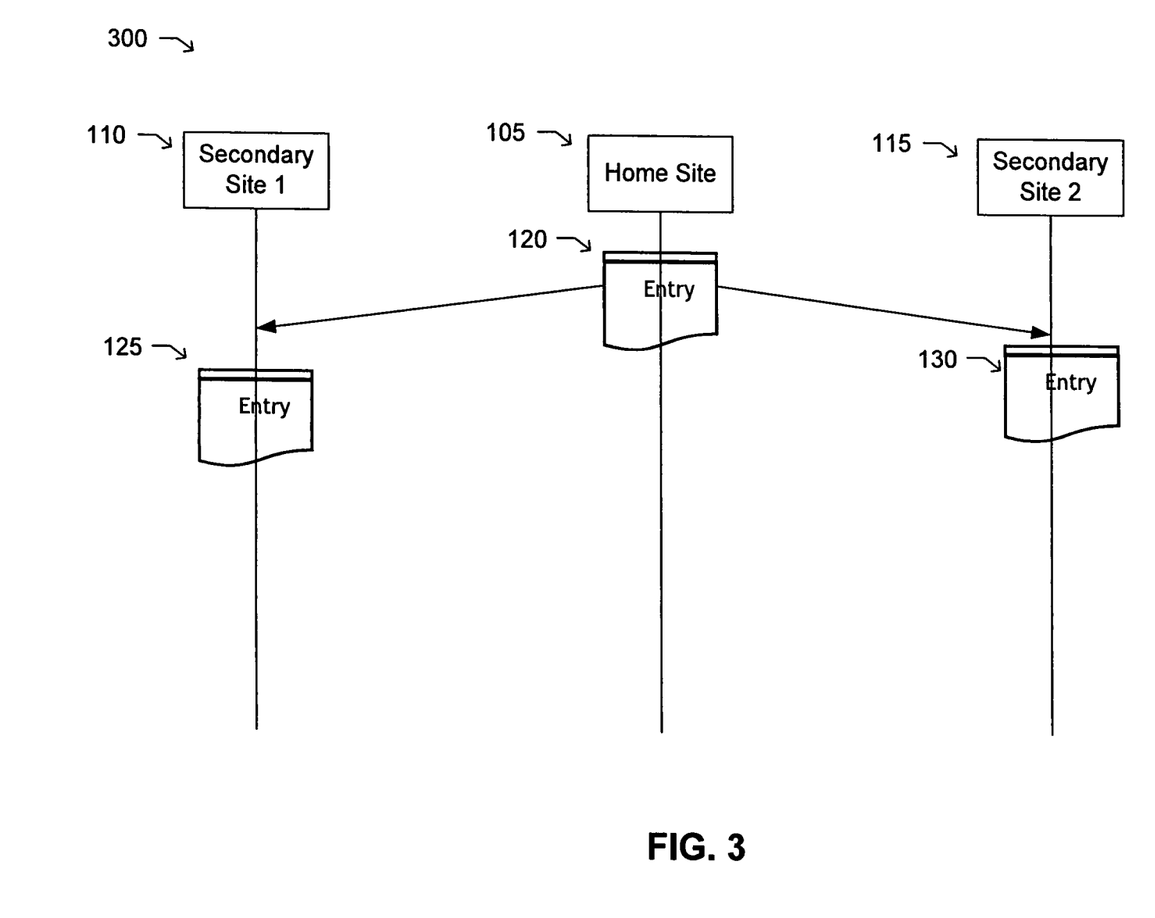
FIG. 3 is one example of a message flow diagram that may illustrate updating content among multiple sites.

Turning now to FIG. 3, which depicts one example of content that is synchronized with secondary sites 110, 115 from the home site 105. The arrows emanating from the entry 120 of the home site 105 indicate that the content of the home site 105 is communicated to secondary site 110 and secondary site 115. The secondary sites 110, 115 may update an associated homing tag with the received content and determine whether to post the received content. Entry 125 denotes the post to secondary site 110, and entry 130 denotes the post to secondary site 115. The content communicated to the secondary sites 110, 115 may be substantially similar, thus the homing tag that the secondary sites 110, 115 create may also be substantially similar. Before posting the communicated content, however, the secondary sites 110, 115 may want to determine whether the content may be posted.

Figure 4:
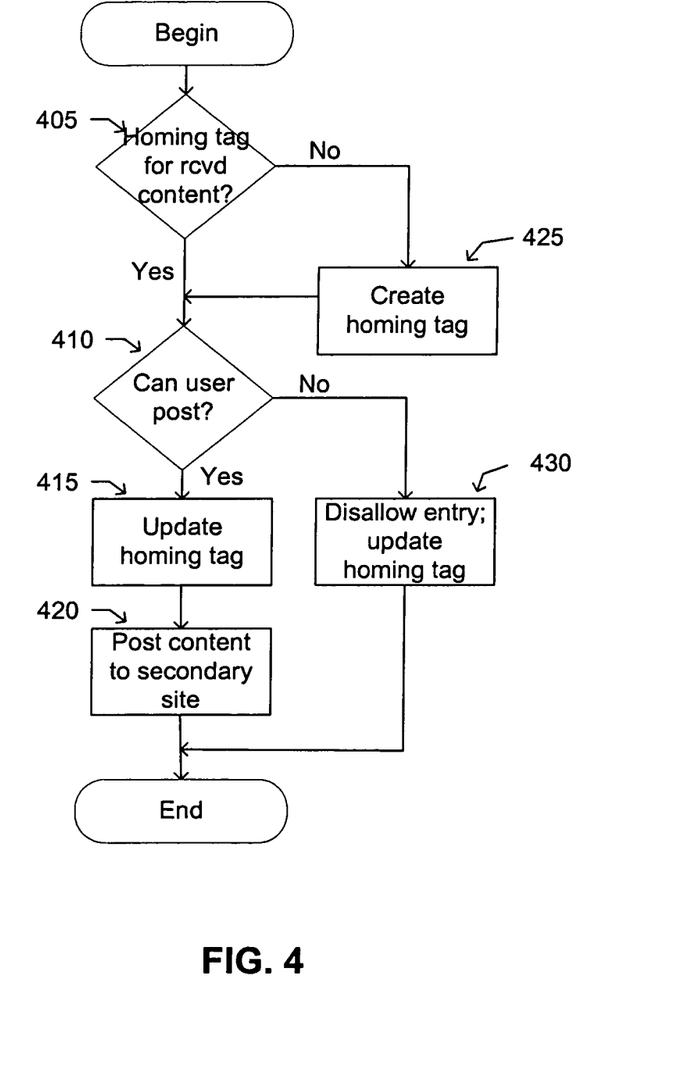
FIG. 4 is one example of a message flow diagram depicting logic flow associated with a method for determining whether to update a homing tag and post received content.

Turning now to FIG. 4, which depicts an example logic diagram that may illustrate a logic flow associated with a method to determine whether to create a homing tag and post content received from a site. The following description is given from the perspective of secondary site 110 and home site 105, where secondary site 110 receives content from home site 105. Although the description of the logical flow is given from the perspective of these two sites 105, 110, a substantially similar logic flow would be executed on secondary site 115 if content were received from the home site 105 at secondary site 115.

At 405, content is received at the secondary site 110. As previously described, the content may be a blog_entry, a homing tag, or some subset of element comprising the homing tag. Thus the content may include tags relating to: source, date, media, content, tools, synchronized_sites, blog_name, poster_name, thread_name, and thread_allowed. The secondary site 110, or the content management software configured on the secondary site, may examine the received content to determine whether a homing tag exists on the secondary site for the received content 405. For example, if the secondary site has a matching homing tag with the same blog_name and same thread_name, the matching homing tag may be associated with the received content. If, however, a homing tag does not exist with the same blog_name and same thread_name, the secondary site 110 may not have a homing tag associated with the received content. If a homing tag does not exist on the secondary site 110 for the received content 405, a homing tag may be created on the secondary site 425.

The secondary site 110 may determine whether the poster, indicated by the poster_name, can post to this site 410. In one embodiment, each secondary site may have a list of poster_names that may be shared among a group of sites that allow blogs to be synchronized. If a poster_name is on that list, the user may be permitted to post. In another, embodiment the poster may enter a valid user name for each site where the user wants the entry synchronized. Thus, the poster_name tag may comprise a name-site tuple for each site where the poster wants an entry to be synchronized. The recipient site may search the tuples for a valid name-site pair that would be permitted to post content on the recipient site. In this example, the poster_name tag may comprise the tuple of "(Facebook.com, Patty@Facebook.com)", where Patty@Facebook.com is a valid poster name on Facebook.com. If the user cannot post 410, the homing tag may still be updated with the received content, but posting the entry may be disallowed 430. If the entry is not allowed, the post_allowed tag may be set to 'NO' which indicates that a particular post was not allowed. If a user is validated at the site at a later time, the previous disallowed posts may be posted to the blog thread.

If the user is allowed to post the received content 410, the homing tag may be updated with received content 415 and the content may be posted to the secondary site 420. At this point, the homing tag on secondary site 110 would look like the homing tag as shown in FIG. 1 except that if the post is disallowed, the post_allowed tag is set to 'NO'.

Figure 5:
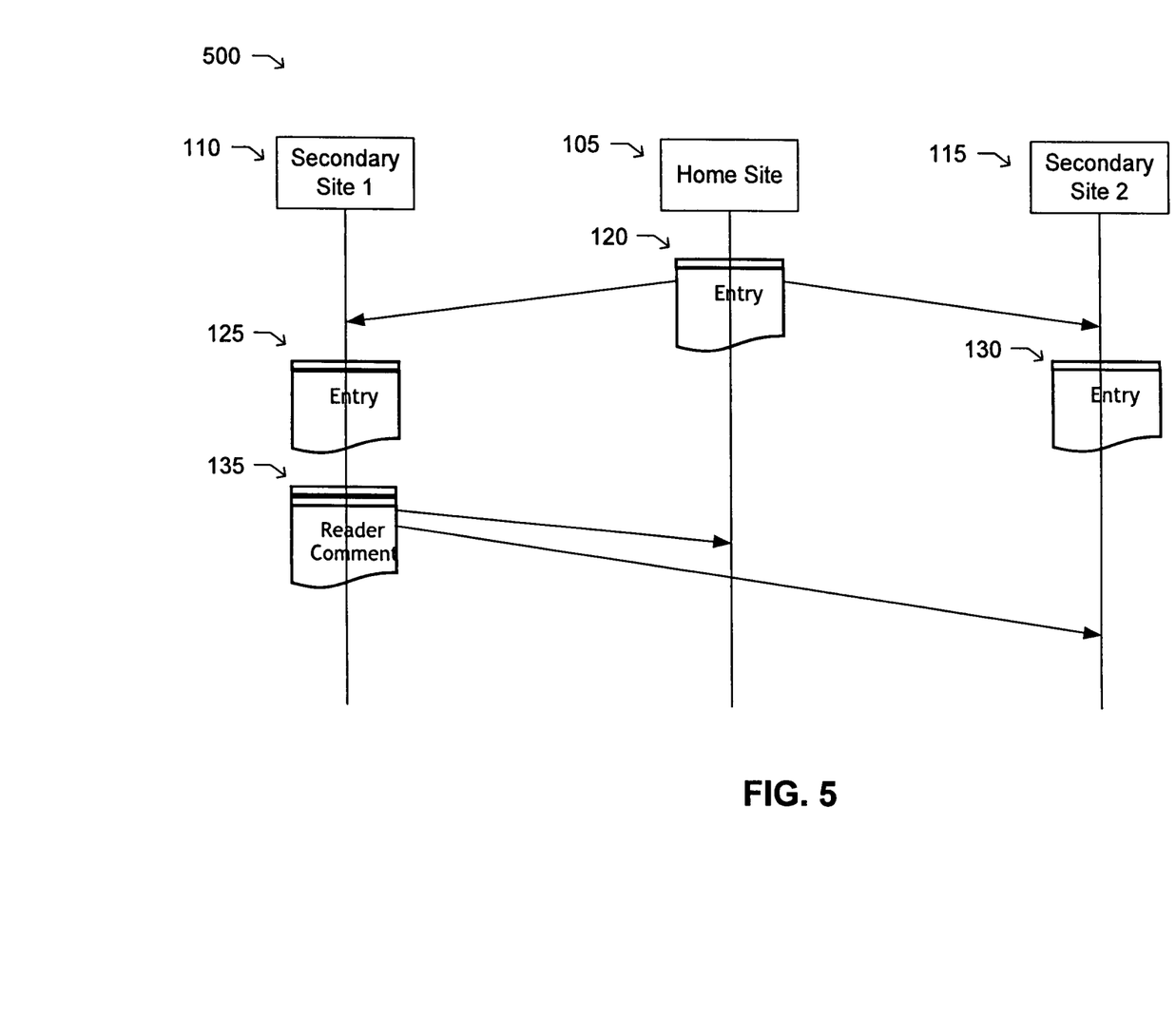
FIG. 5 is an example of incorporating a comment into a homing tag.

Turning now to FIG. 5, which depicts one example message flow of incorporating a comment into an existing homing tag. As seen in FIG. 5, the reader comment 135 is posted to the secondary site 110, and the secondary site 135 communicates the content that was posted on the secondary site 110 to the home site 105 and the secondary site 115. The comment may be posted to a blog thread, and the thread may be associated with a homing tag based on a thread name. When the comment is entered, the secondary site 110 may examine the homing tag associated with the entry 125, and update the homing tag with the entered comment. Home site 105 may have a homing tag associated with the entry 120, and thus home site 105 may update its homing tag with the content received from secondary site 110. Similarly, secondary site 115 may have a homing tag associated with the entry 130, and thus secondary site 115 may update its homing tag 130 with the content received from secondary site 110.

Table 2 includes one example of the homing tag of sites 105, 110, 115 after the homing tag is updated with the reader comment 135:

TABLE 2

```
<?xml version="1.0">
<blog_entry_list count="2">
    <blog_entry>
        <source> Alcatel-LucentBlog.com </source>
        <date> Wed, 6 December, 11:00am </date>
        <media> text </media>
        <post> What are your thoughts on the new LTE standard?
        </post>
        <tools> Wordpress </tools>
        <synchronized_sites> Alcatel-LucentBlog.com, Facebook.com,
Myspace.com </synchronized_sites>
        <blog_name> Patty's Alcatel-Lucent Blog </blog_name>
        <poster_name> Patty@Alcatel-Lucent.com </poster_name>
        <thread_name>LTE Standards Comments</thread_name>
        <post_allowed> YES </post_allowed>
    </blog_entry>
```

TABLE 2-continued

```
    <blog_entry>
        <source> Facebook.com </source>
        <date> Wed, 7 December, 2011, 2:15pm </date>
        <media> text </media>
        <post> I think the new LTE standards need more work.
        </post>
        <tools> Drupal </tools>
        <synchronized_sites> Alcatel-LucentBlog.com, Facebook.com,
Myspace.com </synchronized_sites>
        <blog_name> Patty's Alcatel-Lucent Blog </blog_name>
        <poster_name> Dave@Facebook.com </poster_name>
        <thread_name>LTE Standards Comments</thread_name>
        <post_allowed> YES </post_allowed>
    </blog_entry>
</blog_entry_list>
```

The homing tag depicted in Table 2 is updated to show the new comment 135. Accordingly, blog_entry_list count is now "2" and there is a second blog_entry below the originally posted blog_entry. Thus as seen in Table 2, the original blog_entry remains as the first entry and the second blog_entry includes a new source, Facebook.com, and a new date. Although the media is still text, the user has posted the comment, as seen in the post tag, "I think the new LTE standards need more work." The content management software of secondary site 110 is Drupal, as seen in the tools tag, as opposed to Wordpress in the first blog_entry. The remaining parts of the blog_entry are the same as the first blog entry.

Figure 6:
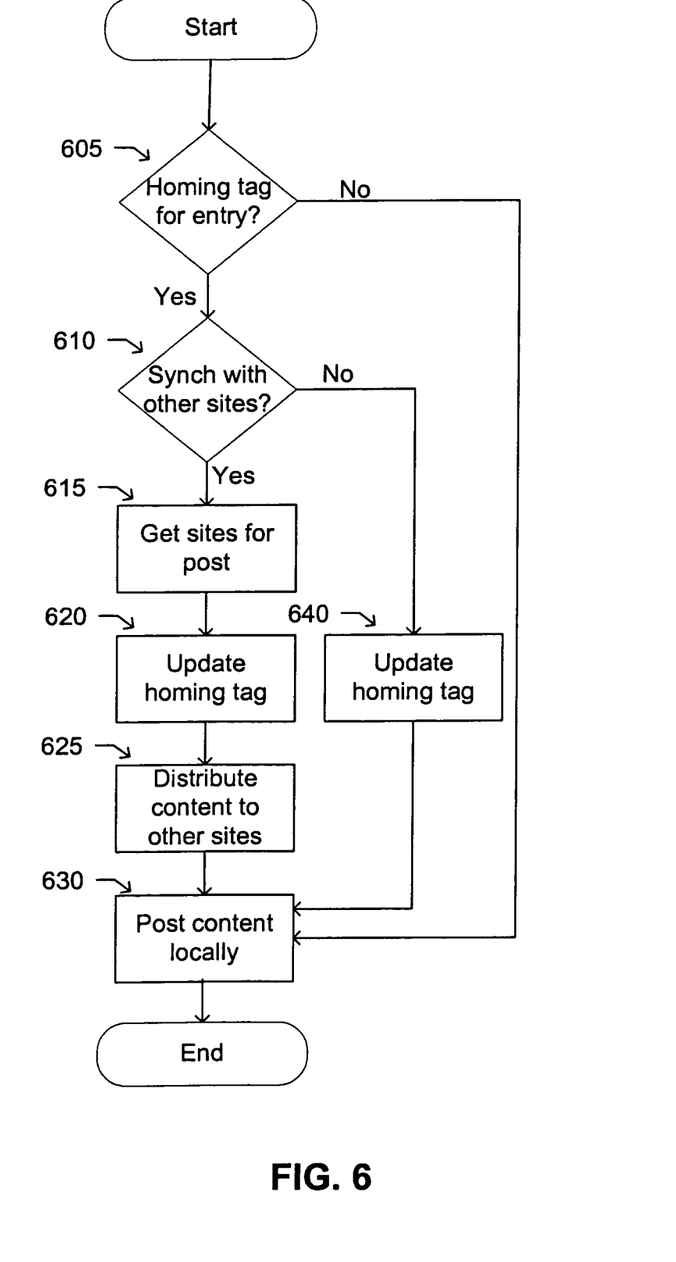
FIG. 6 is one example of a logic flow diagram that may illustrate a logic flow that may be associated with posting content associated with a blog.

Turning now to FIG. 6, which depicts an example logic flow diagram that may reflect a logic flow associated with a method for determining whether to post content associated with a blog. For example, a user may enter a comment on the secondary site 110, the site may ensure that the user is allowed to post to the site 110, and the site 110 may also want to prompt the user to determine if the user wants to synchronize his post with other sites. At step 605, it is determined whether a homing tag exists that is associated with the posted content. Whether a homing tag is associated with the posted content, may be determined based on a thread name and blog name associated with the content. If a homing tag is not associated with the thread, the content may be posted 630 as it regularly would.

If, however, a homing tag entry is associated with the thread 605, the user may be prompted to determine if the post should be synchronized with other sites 610. This may entail displaying to the user the sites with which the content thread is synchronized. Based on the currently synchronized sites, the user may then enter sites with which the comment should be synchronized 615. For example, if the thread is synchronized with three sites, the user may enter all three sites, or a subset of the three sites, as the sites with which the user wants the comment synchronized. The synchronized_sites tag of the homing tag may be updated with these sites 620, the content may be communicated to the other sites comprising the synchronized_sites tag 625, and the content may be posted locally to the secondary site 630. There may be times, however, when a user on a social or company site may not want to have a comment posted outside the site. If the user does not want to synchronize the comment with other sites 610, the homing tag may be updated 610 without prompting the user for other sites with which to synchronize. This case is shown via the "No" branch of step 610. Upon determining whether to synch with other sites, the homing tag is updated with the new content 640, and the content is posted locally 630.

Although the description related to the logic flow of FIG. 6 was given from the perspective of posting a comment to secondary site 110, this method may be performed at the secondary site 115 or the home site 105. Thus, if a user posts a comment on a thread that exists on either the secondary site 115 or home site 105, the logic flow described in relation to FIG. 6 may be executed in a substantially similar manner and the content distributed to the other sites. For example, a user may post a comment to the entry 130 on the secondary site 115 and the content may be synchronized with the home site 105 and the secondary site 110. Similarly, if a user posts a comment to the entry 120 of the home site 105, the comment may be synchronized with the secondary sites 110, 115.

In one embodiment, each blog_entry tag may also comprise an entry_count tag that tracks an entry count. The entry count should be the same as the number of the blog_entry_list count. If a site, for example secondary site 110, receives content from another site that leads to a discrepancy between the blog_entry_list count and the latest entry_count of the homing tag, the secondary site 110 may have missed content that should have been posted to the secondary site 110. Accordingly, the secondary site 110 may communicate a message to the other sites (home site 105 and secondary site 115) asking each site to communicate its latest homing tag to the secondary site 110 so that the secondary site 110 may parse the homing tags of the other sites to determine what content the secondary site 110 is missing.

In still another embodiment, a user may want to hide or not display comments that the user posted to another site. For example, a user may post comments on secondary site 110 that were synchronized with home site 105, and secondary site 115. The user may decide at a later time that the user does not want the comments to be seen on home site 105. The user may log into secondary site 110 and enter a command indicating that the user wants comments hidden related to a blog thread. The secondary site 110 may translate the request into a hide comment message comprising a date tag, a synchronized_sites tag, a blog_name tag, a thread_name tag and a poster_name tag. A recipient of the hide comment message, for example home site 105, may hide or delete comments entered by the poster_name to the thread_name of the blog_name at the site on the communicated date. If the date tag is omitted from the hide comments message, the home site 105 may hide all comments entered by the user associated with the poster_name on the thread_name of the blog_name at the site associated with the site. Further, if the hide comment message does not comprise a thread_name, the home site 105 may hide all the comments associated with the poster_name on the blog_name at the site_name. Further, if the hide comment message comprises a poster_name and a site_name, the home site 105 may hide call the comments at the site_name related to the poster_name.

Figure 7:
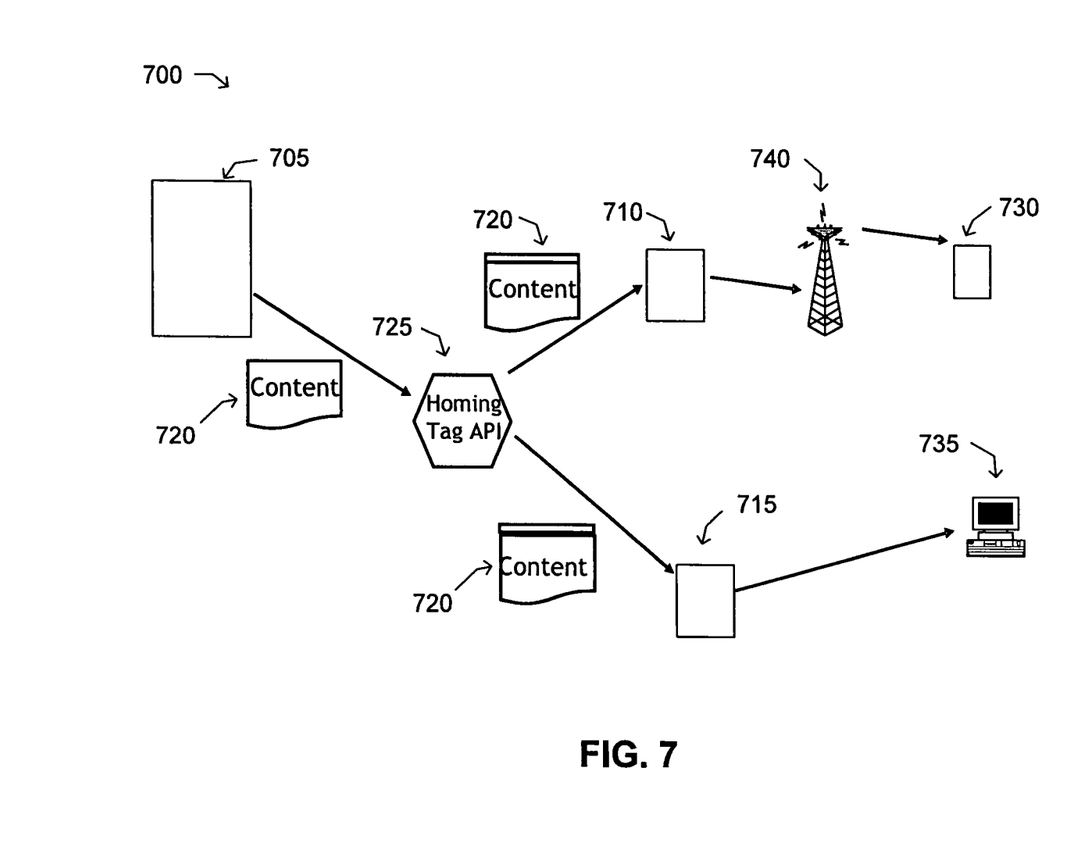
FIG. 7 is one example of an example network architecture that may comprise computing servers that may be synchronized with content.

Turning now to FIG. 7, that may represent an example network architecture 700 where the system and method to synchronize content across networks may execute. The network may be comprised of a number of computing or content servers 705, 710, 715 that may host an application that may provide access to content stored on the servers 705, 710, 715. The content servers may run in different domains or sites. For example, the content server 705 may reside at a work place, the content server 710 may part of a social networking site and the content server 715 may be part of another social networking site. The content servers may be computing servers comprised of any number of processors, as well as memory, firmware or hardware. The previously described operations and methods (for example the operations and methods described in relation to FIGS. 2, 4 and 6) may be configured to run on a processor or a plurality of processors comprising the content servers 705, 710, 715, and the methods may be embodied in the form of software, firmware or hardware. The servers 705, 710, 715 may comprise one or more non-transitory processor-readable media storing instructions which, when executed by a processor, cause the processor(s) to perform a method, such as the methods described herein. In one example, the content may be a blog and the application that provides access to the blog may be content management software. In other examples, the content may be documents that are synchronized among a group of users.

As seen in FIG. 7, the content, which may be in the form of a homing tag, or tags comprising a homing tag, may be synchronized or communicated between the servers 705, 710, 715 of the network 700. In one embodiment, the operations and methods may be invoked through an Application Interface (API) call 725. Regardless of whether methods described herein are embodied in hardware or software, the API call may provide access to the operations of the method. In one example, each server 705, 710, 715 may include an API that operates on content resident on the server 705, 710, 715. In another example, all the information comprising a homing tag and the API 725 itself may reside on a single server. In this case, the API 725 may be remotely invoked and the information to be displayed by a server 705, 710, 715 may be communicated to the intended recipients via the API 725 through the network 700. The content 720 may be distributed by way of the servers 705, 710, 715 to a terminating device, such as a mobile terminal 730 or a computer 735. The content may be distributed via a wireless network, represented in this diagram by a base site 740, or via the Internet (not pictured) or any other packet type network (not pictured).

As explained, the methods described herein may execute on a computing or content server, in one example a content server comprises a plurality of components such as one or more of electronic components, hardware components, and computer software components. A number of such components can be combined or divided in a content server. An example component of a computing or content server employs and/or comprises a set and/or series of computer instructions written in or implemented with any of a number of programming languages, as will be appreciated by those skilled in the art.

A content server in one example employs one or more computer-readable non-transitory signal-bearing media. The computer-readable non-transitory signal-bearing media store software, firmware and/or assembly language for performing one or more portions of one or more implementations of the invention. Examples of a computer-readable signal-bearing medium comprises a recordable data storage medium of a content server. The computer-readable signal-bearing medium for a content server in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method configured to execute on a computing server hosting a first site, the method comprising:
   receiving content at the computing server hosting the first site, wherein the content is to be synchronized with at least one other site on a list of allowable synchronized sites which are hosted on one or more secondary servers;
   determining that there is no existing homing tag on the first site associated with the content;
   generating an XML computer readable homing tag at the first side for storing the content on the computing server; and
   communicating the XML computer readable homing tag to the at least one other site, wherein the XML computer readable homing tag comprises a source element indicating the first site, a date element indicating a date the content was created, a media element indicating media type of the content, a post element indicating the content to be posted to the at least one other site, a tools element indicating software used to create the content, a synchronized sites element indicating the list of allowable synchronized sites, and a post allowed element indicating whether the content should be displayed at the first site.

2. The method of claim 1, where the content to be synchronized further comprises at least one of a poster name, a thread name or a blog name.

3. The method of claim 1, further comprising updating the XML computer readable homing tag if a user is allowed to post to the at least one other site.

4. The method of claim 1, further comprising communicating the XML computer readable homing tag to the at least one other site if a user is avowed to synchronize content with the at least one other site.

5. The method of claim 1, wherein the content that is synchronized with the at least one other site is a blog entry.

6. The method of claim 1, wherein the content to be synchronized is a blog entry that is displayed by the first site, and the blog entry is updated with content that is received from the at least one other site.

7. The method of claim 1, where the first site is configured with the list of allowable synchronized sites with which the first site may synchronize content.

8. The method of claim 1, further comprising synchronizing the content with all entries on the list of allowable synchronized sites indicating sites that may be synchronized with the first site.

9. A method configured to execute on a computing server hosting a first site, the method comprising:
   receiving content associated with a blog post at the computing server having a processor, and determining whether a homing tag is associated with the blog post based on a blog thread name associated with the blog post and blog thread names associated with existing homing tags, wherein an XML computer readable homing tag associated with the blog post and stored on the computing server comprises posted content and a list of synchronized sites identifying the at least one other site hosted on one or more secondary servers, the XML computer readable homing tag comprising a source element indicating the first site, a date element indicating a date the blog post was created, a media element indicating media type of the blog post, a post element indicating the content to be posted to the at least one other site, a tools element indicating software used to create the blog post, a synchronized sites element indicating the list of synchronized sites, and a post allowed element indicating whether the content should be displayed at the first site; and
   updating the XML computer readable homing tag with the content using the processor when the XML computer readable homing tag is associated with the blog post, determining whether the blog post should be synchronized with the at least one other site, and communicating the XML computer readable homing tag to the at least one other site if the XML computer readable homing tag indicates the blog post should be synchronized with the at least one other site.

10. The method of claim 9 further comprising, receiving a selection of the at least one other site, and determining if the at least one other site is included in the list of synchronized sites in the XML computer readable homing tag.

11. The method of claim 10, further comprising communicating the content to the at least one other site if a user associated with the blog post is allowed to post to the at least one other site.

12. The method of claim 9, where the received content comprises at least one of an XML computer readable homing tag or a blog entry.

13. The method of claim 9, where the received content comprises a first count and the XML computer readable homing tag comprises a second count and if the first count does not equal the second count, synchronizing the XML computer readable homing tag with another homing tag received from the at least one other site.

* * * * *